Figure 1:
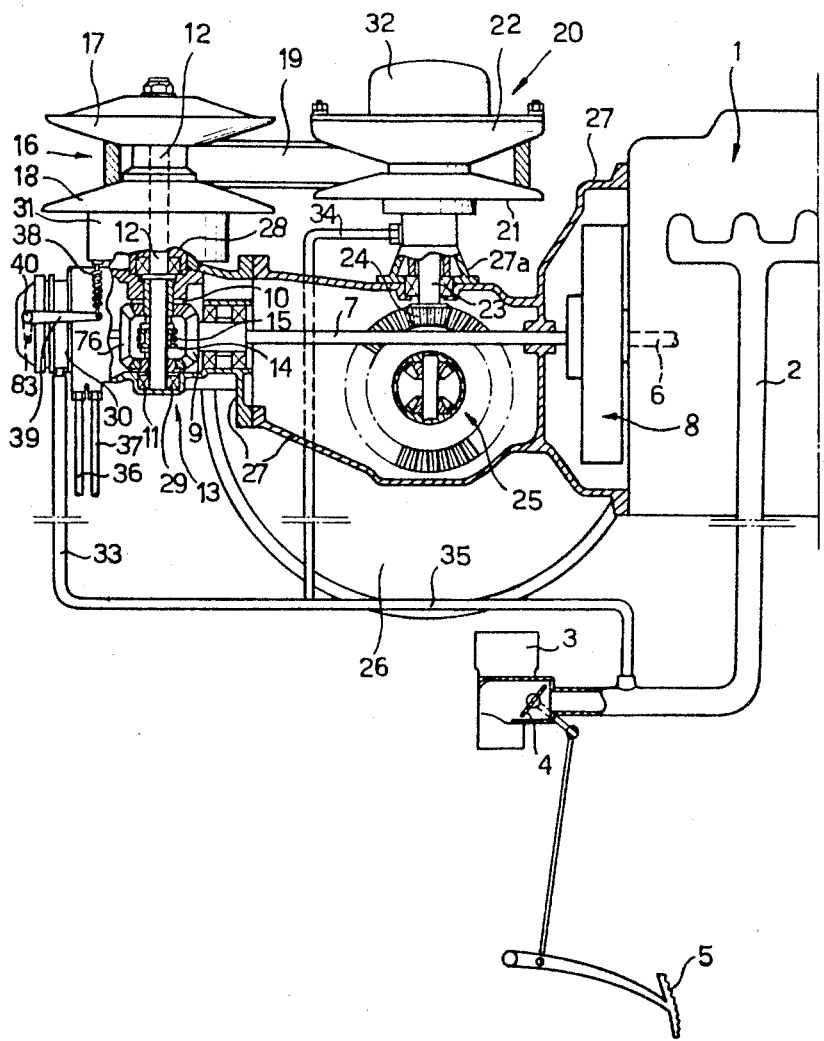

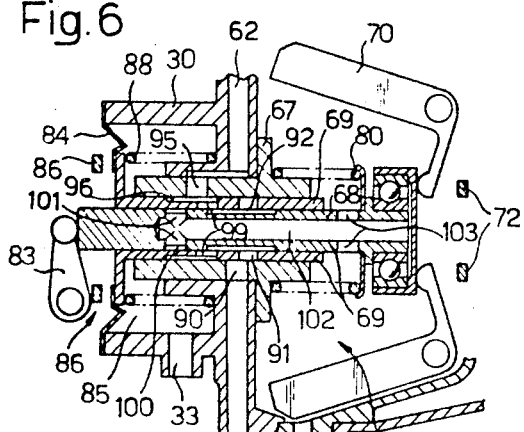
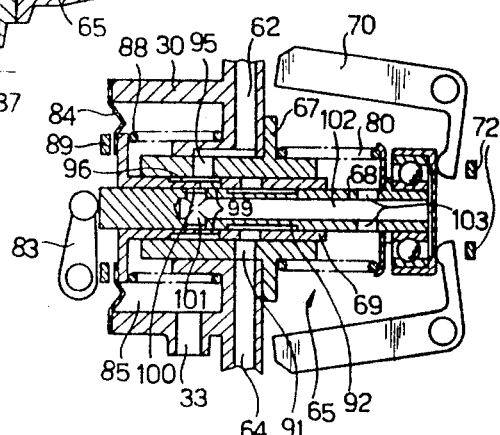
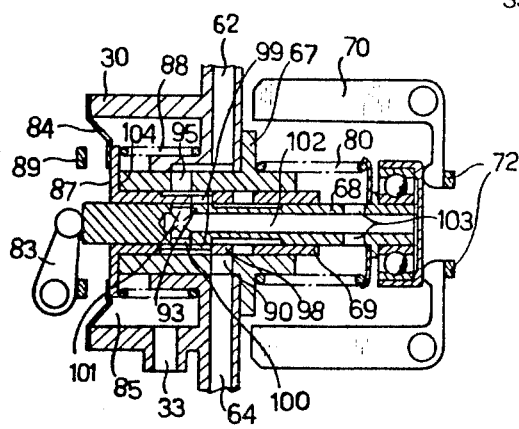

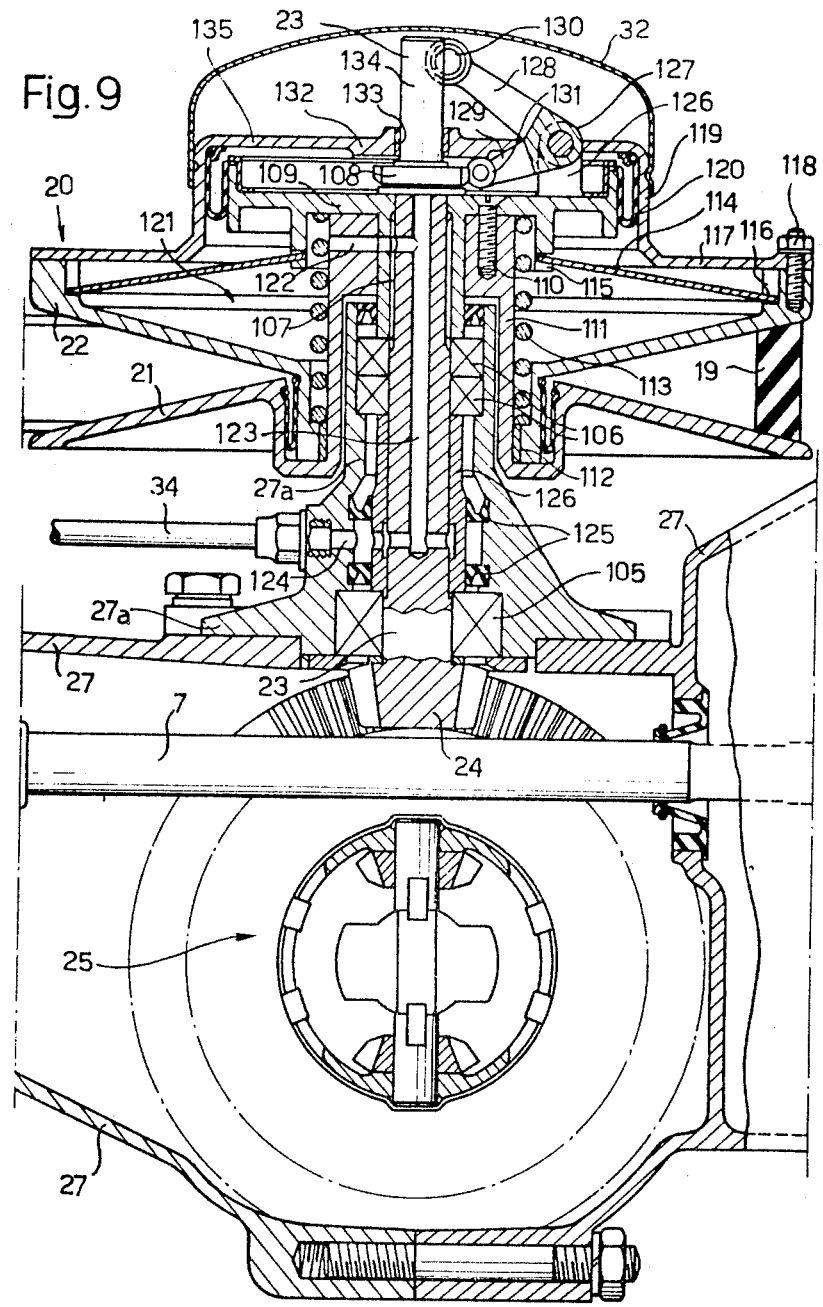

United States Patent Office
3,269,207
Patented August 30, 1966

3,269,207
AUTOMATIC VARIABLE SPEED TRANSMISSION, MORE PARTICULARLY FOR MOTOR VEHICLES
Virgilio Borsattino, Turin, Italy, assignor to Sira Società Industriale Ricerche Automotoristiche, Turin, Italy
Filed May 15, 1964, Ser. No. 367,701
Claims priority, application Italy, May 21, 1963, 10,910/63; Feb. 15, 1964, 3,754/64
3 Claims. (Cl. 74—472)

This invention relates to automatic variable speed transmissions comprising an automatic friction clutch and a variable speed drive having a V-belt operating on expansible pulleys.

Transmissions of this type are known in which are as the engine reaches its predetermined minimum number of revolutions, the friction clutch is automatically clutched in and the variable speed transmission transmits power at a ratio suited to the speed of the engine and the speed of the vehicle through intervention of automatic means for the control of expansion of the driving pulley comprising centrifugal weights rotated by the driving shaft and a pneumatic cylinder connected with the engine induction conduit.

The movable members of the centrifugal weights and the piston of the pneumatic cylinder directly effect axial displacements of the movable flange on the driving pulley, adaptation of the driven pulley being effected through deformation of the springs interposed between the stationary and movable flanges of the driven pulley.

In the abovementioned known transmissions the centrifugal weights, pneumatic piston and connecting means between said items and the movable flange should be made of an adequate size and strength in order to directly displace the movable flange thus increasing weight and inertia of the pulley, which adversely affects sensitivity and promptness of response.

In said transmissions the belt tension varies during operation. On acceleration of the vehicle the centrifugal weights on the driving pulley draw the flanges together, whereby the belt is caused to travel over a circumference of increasing radius.

This increase is compensated by the decrease in radius of the driven pulley, the flanges of which are drawn apart by the belt becoming wedged in the groove in the driven pulley against spring action which increases with compression. Clamping of the belt between the flanges on the driven pulley, hence the belt tension rise beyond the necessary value for transmitting the maximum torque, thereby reducing efficiency of the transmission and causing wear of the belt and pulleys.

An object of this invention is to improve the sensitivity and promptness of response of the driving pulley to the operating conditions of the motor vehicle.

A further object of this invention is to maintain the belt tension constantly at its minimum value proportioned to the torque being transmitted in order to improve efficiency of the transmission and reduce wear of the belt.

With the above and further objects in view this invention provides in an automatic power transmission comprising two expansible pulleys, namely, a driving and driven pulley, respectively, mounted on their respective shafts and interconnected by a V-belt: (A) a hydraulic actuator having its movable part operatively connected with the movable flange of the driving pulley to effect axial displacements of said flange and controlled by a valve operated by a centrifugal regulator rotated by the driving shaft and by the deformation of a pneumatically sealed chamber connected with the engine induction conduit; (B) a centrifugal regulator rotated by the driven shaft and a sealed chamber pneumatically connected with the induction conduit, said regulator and chamber being operatively connected with the movable flange of the driven pulley for opposing the springs which tend to maintain the movable flange of the driven pulley close to its respective stationary flange.

The invention shall be described with reference to the accompanying drawings which show a preferred embodiment.

Figure 2:
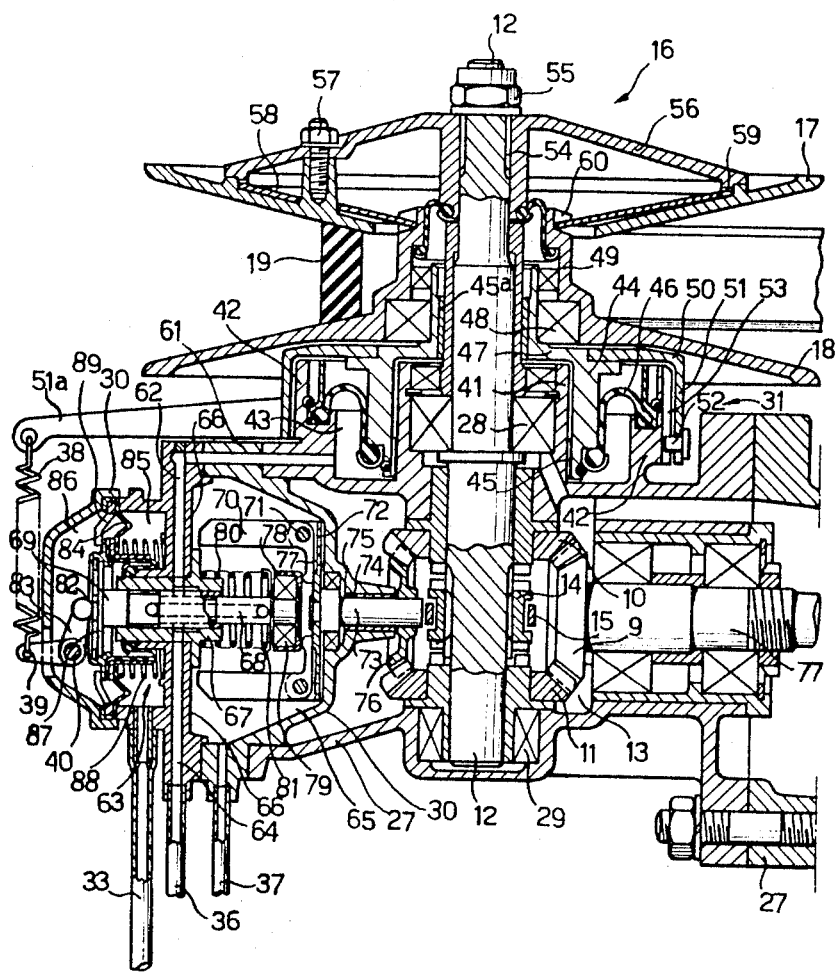

FIGURE 1 diagrammatically shows the transmission according to this invention;
FIGURE 2 is an axial sectional view in an enlarged scale of a detail of FIGURE 1;
FIGURES 3 to 8 show diagrammatically the distribution valve in various operative positions;
FIGURE 9 is an axial sectional view in an enlarged scale of a detail of FIG. 1.

In FIGURE 1, 1 denotes a motor vehicle engine having an induction conduit 2 and carburetor 3 provided with a throttle valve 4 controlled by a pedal 5.

The driving shaft 6 is connected to one end of a transmission shaft 7 by a friction clutch 8 of a known automatic type adapted to interconnect the shafts 6 and 7 only when the engine 1 reaches a predetermined number of revolutions.

The shaft 7 is provided at its other end with a bevel pinion 9 meshing with two pinions 10, 11 freely mounted on a shaft 12 and forming part of a reversing gear 13.

The pinions 10, 11 can be selectively coupled with the shaft 12 to throw in the forward or reverse gear, or they can be retained in an intermediate neutral position by a dog clutch 14 hand-operated by means of a fork 15. The shaft 12 has mounted thereon a driving pulley 16 having a fixed frustoconical flange 17 keyed to the shaft 12 and a similar flange 18 axially slidable with respect to the shaft 12.

The driving pulley 16 drives a V-belt 19 which wraps a driven pulley 20 comprising a frustoconical flange 21 fixed to a driven shaft 23 and a frustoconical flange 22 axially slidable on the said driven shaft.

The shaft 23 is provided with a bevel pinion 24 engaging a differential gear 25 driving the vehicle wheels 26.

The clutch 8, driven shaft 7, reversing gear 13 and differential gear 25 are enclosed by a common housing 27 rigidly secured to the engine block 1.

Seats formed in the housing 27 receive bearings 28, 29 for the shaft 12 for the driving pulley 16, the shaft 23 for the driven pulley 20 being mounted in a tubular support 27a secured to the housing 27.

A further housing 30 is secured to the housing 27 and encloses the control device for a hydraulic actuator 31 controlling closure of the groove in the driving pulley 16, while the control device for opening the groove in the driven pulley 20 is enclosed by a cover plate 32 secured to the movable flange 22.

In order to operate the said control devices, which shall be described hereafter, the latter are connected by conduits 33, 34, 35 with the induction conduit 2.

The control device for the hydraulic actuator 31 for the driving pulley 16 is connected with a pressure oil feed conduit 36 to an oil pump, not shown, and with a discharge conduit 37 to the oil sump, not shown.

Said control device is moreover operated by a spring 38 having one end fixed to an axially slidable portion of the hydraulic actuator 31, and its other end secured to a bell crank lever 39 mounted on the housing 30 by means of a pivot 40.

As shown in FIGURE 2, the hydraulic actuator 31 is arranged coaxially with the shaft 12 and comprises a stationary annular cylinder 43 having a wall formed by a hub 41 carrying a bearing 28 and an annular wall 42, both walls being fast with the housing 27. The cylinder 43 has axially mounted therein an annular piston 44 provided with two sealing rings 45, 45a and an annular flexible diaphragm 46 secured to said piston 44 and wall 42. The end of the piston 44 extending beyond the cylinder 43 is formed with an annular seat 47 for a thrust bearing 48 having mounted thereon a hub 49 for the movable flange 18 of the pulley 16.

A cover plate 50 is secured to said end of the piston 44 and is provided with a tubular wall 51 externally slidable on the wall 42. Rotation of the piston 44 and seat 47 is prevented by a pin 52 radially secured to the wall 51, slidable in an axial groove 53 in the wall 42.

With this arrangement, i.e. with the cylinder 43 stationary, the oil therein is not subjected to centrifugal action which would disturb operation of the hydraulic cylinder 31.

A disc 56 is secured to the free end of the shaft 12 by means of a splined coupling 54 and clamp nut 55, and has secured thereto the fixed flange 17 by means of screws 57.

Rotation of the fixed flange 17 is transmitted to the movable flange 18 by means of a frusto conical disc spring 58 provided in its internal and external circumference with radial teeth engaging teeth 59, 60 in the disc 56 and hub 49 on the movable flange, respectively. The spring 58 tends to keep the flanges 17, 18 apart against the action of the hydraulic cylinder 31.

The oil inlet to the cylinder 43, and outlet therefrom is effected through conduits 61, 62, respectively, which can be selectively connected by a valve 63 with a conduit 64 connected with the oil feed conduit 36 or with a chamber 65 formed in the housing 30 by a partition 66, and connecting with the oil discharge conduit 37.

The valve 63 comprises a tubular body 67 secured to the partition 66 having mounted therein in a coaxial and mutually slidable relationship a piston 68 and a tubular slide 69.

Axial displacements of the piston 68 are effected by centrifugal weights 70 arranged in the chamber 65 pivoted about pivots 71 to a disc 72 secured to one end of a shaft 73 mounted on a bushing 74 accommodated by a seat 75 in the housing 30. The other end of the shaft 73 has keyed thereon a bevel pinion 76 meshing with pinions 10, 11.

The centrifugal weights 70 are provided with arms 77 bearing at one end on said disc 72 and at their other end on a cover plate 78 rotatably mounted on one end of the piston 68 through a thrust bearing 79.

The piston 68 is biased towards its inoperative position against the disc 72, which acts as a limit stop, by a spring 80 interposed between the body of the valve 63 and a cup-shaped washer 81 secured to the piston 68 in proximity to the bearing 79.

An arm 83 of the bell crank lever 39 bears against the opposite end 82 of the tubular slide 69, the other lever arm being connected through a spring 38 to the wall 51 of the cover plate of the hydraulic actuator 31.

For clearness of the drawing, in FIG. 2 the spring 38 is shown outside the area occupied by the valve 63, the lever 39 being reversed with respect to its preferred position shown in FIGURE 1; moreover, for the sake of the drawing the spring 38 is shown connected to an arm 51a extending from the wall 51.

On the other side of the chamber 65 the space in the housing 30 is subdivided by a flexible annular diaphragm 84 into a chamber 85 connected with the induction conduit 33, and a chamber 86 connecting with the outside.

The outer edge of the diaphragm 84 is secured to the housing 30, its inner edge being secured to a flat head 87 attached to the end of the slide 69.

A spring 88 is arranged between the head 87 and partition 66 and tends to hold the slide 69 against a limit stop 89 secured to the housing 30.

FIGURES 3 to 8 show diagrammatically the positions taken by the piston 68 and slide 69 of the valve 63 dependently upon the speed of the engine 1 and opening of the throttle valve 4.

Figure 3:
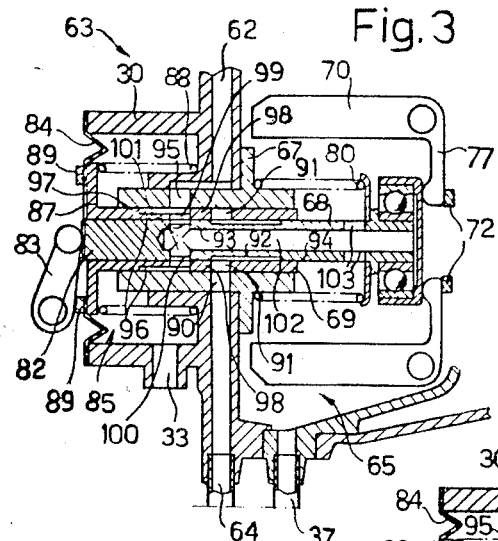

More particularly, FIGURE 3 shows the inoperative position when the piston 68 and slide 69 are biased by the springs 80, 88 against their respective limit stops 72, 89.

In this position the port 90 of the feed conduit 64 is aligned with radial holes 91 in the slide 69 and with one end of the annular groove 92 defined by lands 93, 94 on the piston 68 which close the pressure oil flow to the cylinder 43.

The port 95 of the conduit 62 connecting with the hydraulic cylinder 43 is aligned with one end of the annular groove 96 formed between the lands 97, 98 on the slide 69. The groove connects through radial holes 99 with a conduit bored in the piston 68, comprising a groove 100 connected through radial holes 101 and an axial hole 102 with radial holes 103 opening into the chamber 65 which connects with the oil exhaust conduit 37.

Consequently, the cylinder 43 is empty and the disc spring 58 holds the flanges 17, 18 apart.

Similar conditions occur as the vehicle begins to accelerate, when the throttle valve 4 is open and the engine revolutions are still low. Consequently, the centrifugal weights 70 cannot compress the springs 80, 38 and remain closed. Also the subatmospheric pressure in the chamber 85 is insufficient to compress spring 88.

Figure 4:
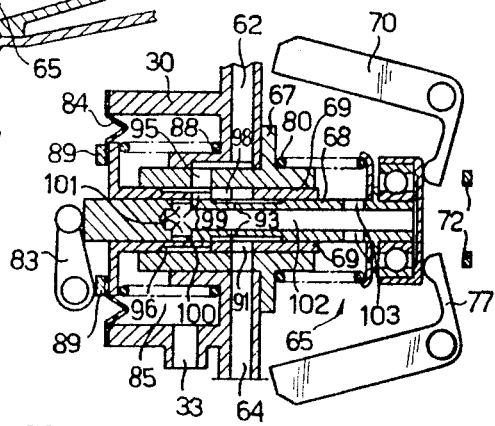

Oil feed to the cylinder 43 is intercepted until the engine reaches revolutions corresponding to maximum torque (FIGURE 4).

The slide 69 keeps stationary, while the centrifugal masses move the piston 68 against the springs 80 and 38 till the lands 93 close the radial holes 99 in the slide, thereby intercepting communication of the conduit 62 and the chamber 65.

A rise in revolutions of the engine up to its highest value, still with the throttle valve 4 opened, (FIG. 5), results in a further drawing apart of the centrifugal masses 70 and relative displacement of the piston 68, the lands 93 on which uncover the holes 99 in the slide and opens communication of the conduits 64 and 62 through groove 92.

Pressure oil is thereupon fed to the cylinder 43 and the piston 44 by compressing the spring 58 draws the movable flange 18 towards the fixed flange 17.

FIGURE 6 shows the position taken by the valve 63 at low speed of the vehicle when the throttle valve 4 is partly open.

Under these conditions the centrifugal weights 70 maintain against the action of the springs 80, 38 the piston 68 in an intermediate position; simultaneously, a fall in pressure in the induction conduit 2 and chamber 85 sets up a sufficient force to compress the spring 88 and move the slide 69 to a balanced position, in which the pressure oil feed conduit 64 and conduit 62 are interconnected through the hole 91, groove 92, holes 99 and groove 96.

On a further decrease of revolutions of the engine and an inherent decrease in suction (FIGURE 7), the piston 68 is moved by expansion of the springs 88 and contraction of the springs 38 and the slide 69 is displaced in an opposite direction due to expansion of the spring 88.

Consequently, the cylinder 43 is connected with the exhaust conduit 37 through the conduit 62, groove 96, holes 99, groove 100 and holes 101, the latter connecting through the conduit 102 and holes 103 with the chamber 65.

Consequently, in the intermediate positions of the valve 63 shown in FIGURES 6 and 7, the cylinder 43 can be alternately filled and emptied by drawing the movable flange 18 and fixed flange 17, together or apart.

Under these conditions the action of the spring 38 is particularly important in improving sensitivity of the valve 63, inasmuch as its tension, hence its reaction to the expansion of the centrifugal weights 70 is a function of the displacement of the piston 68 in the valve 63, and of the displacement of the piston 44 in the hydraulic actuator 31 the latter corresponding to the displacement of the movable flange 18.

In FIGURE 8 the valve 63 is located for a minimum speed of the vehicle, when the throttle valve 4 is closed and the revolutions of the engine just exceed the revolutions at which the automatic clutch 8 opens.

In this case the spring 80 presses the piston 68 thereby drawing together the centrifugal masses 70 against the limit stop 72, while the suction in the chamber 85, by compressing the spring 88, moves the disc 87 of the slide 69 till it abuts the end 104 of the valve body 67, thereby closing the hole 99 and port 90 by lands 93, 98 and intercepting communication of the conduits 62, 64, 37. If the revolutions of the engine 1 fall on account of external resistances, or when the pedal 5 is depressed, the pressure in the chamber 85 rises and the spring 88 expands and displaces the slide 69, thereby interconnecting through holes 99, 101 the conduit 62 with the conduit 37, which causes the pulley 18 to expand, whereby the engine can accelerate.

As shown in FIGURE 9, the shaft 23 for the driven pulley 20 is mounted in the tubular support 27a by means of a bearing 105 and a pair of bearings 106.

The intermediate portion of the shaft 23 extending beyond the support 27a has secured thereto by means of splines 107 and clamp nut 108, a disc 109 having attached thereto by means of screws 110 the hub 111 of the fixed flange 21. The hub 111 has axially slidable thereon the movable flange 22 which is provided with a flexible bellows 112 arranged in the bottom of the pulley groove and affording a seal between the flanges 21, 22.

The movable flange 22 is pressed towards the fixed flange 21 by a helical spring 113 and a frusto conical disc spring 114. Both springs 113, 114 have one end bearing on the disc 109 and other end bearing on the movable flange 22.

The springs 113, 114 are pre-stressed by an extent such that with springs expanded keeping the flanges 21, 22 of the driven pulley 20 drawn towards each other and the belt 19 on the outer edge of the pulley, the springs 113, 114 maintain the belt 19 at a tension sufficient for transmission of the maximum torque.

The movable flange 22 is coupled in rotation with the fixed flange 21 by the spring 114 provided in its inner and outer circumference with radial teeth engaging with teeth 115 in the disc 109 and teeth 116 in an annular plate 117 secured to the outer edge of the movable flange 22 by screws 118.

The plate 117 is provided with a cylindrical sleeve 119 surrounding the disc 109 and the clearance between said disc and the sleeve 119 is closed by a flexible bellows 120 so that the space between the movable flange 22, hub 111 and disc 109 forms a sealed deformable chamber 121 connecting with the conduit 34 through a radial conduit 122 bored in the hub 111, an axial conduit 123 in the shaft 23 and a radial conduit 124 in the support 27a.

Penetration of outside air into said conduits is prevented by two sealing rings 125 arranged in the clearance between the support 27a and a spacer 126 mounted on the shaft 23 between the bearings 105, 106.

Externally of the chamber 121, the disc 109 carries tabs 126 having engaging therewith pivots 127 for the bell crank levers having arms 128, 129 radially extending towards the shaft 23.

Centrifugal weights 130 are secured to the ends of the arms 128. The ends of the arms 129 carry rollers 131 bearing against a support 132 freely mounted by means of a bushing 133 on the end 134 of the shaft 23 extending beyond the clamp nut 108.

The support 132 is secured to the sleeve 119 by spokes 135, so that the displacements of the support 132 due to expansion of the centrifugal weights 130 tend to draw the movable flange 22 away from the fixed flange 21 against the action of the springs 113, 114.

In their inoperative position the weights 130 are urged by springs 113, 114 to close around the axis of the shaft 23.

The centrifugal masses 130 are enclosed by a cover plate 32 secured to the sleeve 119.

The automatic power transmission according to this invention operates as follows.

During starting of the vehicle, the throttle valve 4 being open, and till the number of revolutions of the engine corresponding to highest torque is reached, the feed of pressure oil to the hydraulic actuator 31 is intercepted by the valve 63 which is in one of the positions shown in FIGS. 3, 4; the spring 58 being free to expand in order to draw the movable flange 18 away from the fixed flange 17, so that the belt 19 fits into the groove bottom the driving pulley 16.

Simultaneously, the springs 113, 114 hold the flanges 21, 22 close together and by moving the belt 19 to the outer edge of the driven pulley 20 they set the transmission for low speed drive (FIG. 1).

The centrifugal weights 130 keep close to the axis of the shaft 23 and do not reduce the pressure exerted by the springs 113, 114 on the movable flange 22.

Though the throttle valve 4 is open, the low air suction from the chamber 121 is not effective to draw the movable flange 22 away from the fixed flange 21. Consequently, the tension of the belt 19 due to clamping between the flanges 21, 22, maintains its predetermined value as required for transmitting the highest torque. By holding the throttle valve 4 open the vehicle speed rises up to its highest speed, while the transmitted torque decreases.

Figure 5:
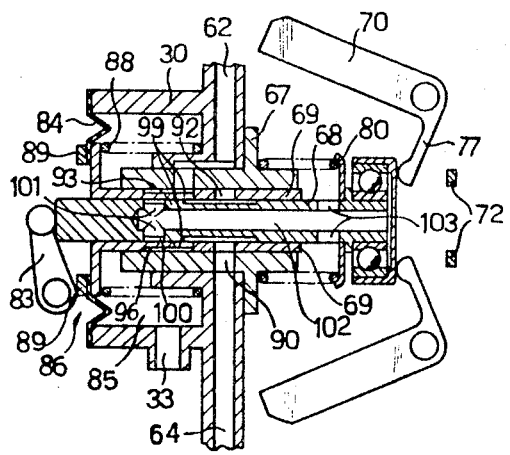

The valve 63 takes the position shown in FIGURE 5 and supplies oil to the hydraulic actuator 31 thereby increasing the effective radius of the driving pulley 16. By moving radially, the belt 19 wedges itself into the groove in the driven pulley 20 and compressing the springs 113, 114 removes the movable flange 22 from the fixed flange 21, thereby setting the transmission for a high speed drive.

The revolutions of the driven shaft 23 rise and the centrifugal masses 130 are drawn apart and tend to draw the movable flange 22 away from the fixed flange 21, thereby decreasing the pressure of the springs 113, 114 on the belt 19. Consequently, the tension of the belt 19 decreases in accordance with the decrease in the transmitted torque. When the throttle valve 4 is partially opened the vehicle speed and transmitted torque are less than their respective maximum values. The valve 63 takes the positions shown in FIGS. 6, 7 in order to alternately open and close oil feed to the hydraulic cylinder 31, the belt 19 surrounds the pulleys 16, 20 over circumferences of intermediate radii corresponding to the required intermediate transmission ratios The decrease in number of revolutions of the driven shaft 23 results in a decrease in the force exerted by the centrifugal weights 130.

However, this decrease is balanced by the increased air suction from chamber 121, which tends to remove the movable flange 22 from the fixed flange 21 so that, when proceeding of intermediate speeds, the tension of the belt 19 is also reduced in accordance with the transmitted torque.

At low vehicle speed, the throttle valve 4 being closed, the valve 63 assumes the position shown in FIG. 8 and intercepting oil feed to the hydraulic actuator 31, sets the transmission for low speed drive.

The centrifugal weights 130 draw close and become ineffective, while the action due to air suction from the chamber 121 rises to its highest value and affords a sufficient force to reduce the pressure of springs 113, 114, which reduces the tension of belt 19.

What I claim is:

1. Automatic variable speed transmission more particularly for motor vehicles, of the type in which the driving shaft is coupled with the internal combustion engine by an automtic clutch, the driven shaft being connected with the stub axles of the wheels through a differential gear, said transmission comprising two expansible pulleys, namely a driving and a driven pulley, respectively, interconnected by a V-belt, each pulley comprising a flange fixed to its respective shaft and a movable flange capable of axial displacement on its respective shaft; means for controlling the axial displacements of the movable flange of the driving pulley comprising a hydraulic actuator having its movable portion operatively connected with said movable flange and a valve hydraulically connected with said actuator and with feed and discharge conduits for a pressure fluid, said valve comprising a body, a first and a second valve member which are relatively movable and axially slidable in the body of the valve, springs arranged between said valve body and each of said valve members in order to maintain their respective valve member in an inoperative position, in which the discharge conduit connects with the hydraulic actuator, the first valve member being axially displaceable by a centrifugal governor rotated by the driving shaft, the second valve member being axially displaceable by the deformation of a sealed deformable chamber pneumatically connected with an induction conduit of the engine and means for controlling the axial displacements of the movable flange of the driven pulley comprising spring means arranged between the driven shaft and the movable flange of the driven pulley and urging said movable flange towards the fixed flange, a centrifugal governor rotated by the driven shaft and operatively connected with the movable flange of the driven pulley and a deformable sealed chamber pneumatically connected with the induction conduit of the engine and having a fixed wall fast with the driven shaft and a movable wall connected with the movable flange of the driven pulley, the action of the last mentioned centrifugal governor on rise in number of revolutions of the driven shaft, and the action due to air suction from the last mentioned chamber being oppositely directed to the action of the springs urging the movable flange of the driven pulley towards the fixed flange.

2. Transmission as claimed in claim 1, wherein the first valve member is maintained in its inoperative position by the spring opposing the centrifugal governor rotated by the driving shaft till the engine reaches its number of revolutions corresponding to maximum torque.

3. Transmission as claimed in claim 1, wherein the first valve member is operatively connected with the movable portion of the hydraulic actuator by spring means acting concordantly with the spring arranged between the body of the valve and said first valve member controlled by the centrifugal governor rotated by the driving shaft, whereby the reaction opposed to said centrifugal governor increases as the movable flange is drawn towards the stationary flange of the driving pulley.

References Cited by the Examiner
UNITED STATES PATENTS

| 2,260,798 | 10/1941 | Burns. |
| 2,754,691 | 7/1956 | May _____ 74—230.17 X |
| 3,146,633 | 9/1964 | Schmitter et al. __ 74—230.17 X |

DAVID J. WILLIAMOWSKY, *Primary Examiner.*

J. A. WONG, *Assistant Examiner.*